United States Patent
Ashton et al.

(10) Patent No.: US 7,057,202 B2
(45) Date of Patent: **\*Jun. 6, 2006**

(54) ULTRA-HIGH DENSITY STORAGE DEVICE USING PHASE CHANGE DIODE MEMORY CELLS AND METHODS OF FABRICATION THEREOF

(75) Inventors: Gary R. Ashton, Eagle, ID (US); Robert J. Davidson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/673,003

(22) Filed: Sep. 26, 2003

(65) Prior Publication Data

US 2005/0067611 A1    Mar. 31, 2005

(51) Int. Cl.
*H01L 47/02* (2006.01)
(52) U.S. Cl. .................. 257/4; 257/3; 257/5; 257/42; 257/44; 257/613; 257/614; 257/10; 257/11
(58) Field of Classification Search ............ 257/4, 257/3, 5, 44, 98, 42, 613, 614, 10, 11
See application file for complete search history.

(56) References Cited

U.S. PATENT DOCUMENTS

| | | | |
|---|---|---|---|
| 3,983,542 A | 9/1976 | Ovshinsky et al. | |
| 5,557,596 A | 9/1996 | Gibson et al. | |
| 6,256,224 B1 | 7/2001 | Perner et al. | |
| 6,262,421 B1 | 7/2001 | Tran | |
| 2002/0176349 A1 | 11/2002 | Gibson et al. | |
| 2003/0081527 A1 | 5/2003 | Gibson et al. | |
| 2004/0086802 A1 | 5/2004 | Gibson | |
| 2004/0218499 A1 * | 11/2004 | Chaiken | 369/94 |
| 2005/0048733 A1 * | 3/2005 | Ashton et al. | 438/381 |

OTHER PUBLICATIONS

Kampmann, et al. A Cadmium-free CuInSe2 Superstrate Solar Cell Fabricated by Electrodeposition Using a ITO /n2Se3/CuInSe2/Au Structure; Progress in Photovoltaics; (1999) pp. 129-135.

Rechid, et al. Characterising Superstrate CIS solar cells with electron beam induced current; Thin Solid Films; (2000) pp. 361-362.

(Continued)

*Primary Examiner*—Minhloan Tran
*Assistant Examiner*—Tan Tran

(57) ABSTRACT

An ultra-high density data storage device using phase-change diode memory cells, and having a plurality of emitters for directing beams of directed energy, a layer for forming multiple data storage cells and a layered diode structure for detecting a memory or data state of the storage cells, wherein the device comprises a phase-change data storage layer capable of changing states in response to the beams from the emitters, comprising a material containing copper, indium and selenium. A method of forming a diode structure for a phase-change data storage array, having multiple thin film layers adapted to form a plurality of data storage cell diodes, wherein the method comprises depositing a first diode layer of material on a substrate, and depositing a second diode layer of phase-change material on the first diode layer, the phase-change material containing copper, indium and selenium.

20 Claims, 5 Drawing Sheets

OTHER PUBLICATIONS

Ward, et al. Cu(In,Ga)Se2 Thin-Film Concentrator Solar Cells; NCPV Program Review Meeting; Oct. 2001.

Scofield, et al. Sputtered molybdenum bilayer back contact for copper indium diselenide-based polycrystalline thin-film solar cells; Thin Solid Films (1995) pp. 26-31.

Gabor, et al. High-efficiency CuInxGa1-xSe2 solar cells made from (Inx,Ga1-x)2Se3 precursor films; American Institute of Physics, (1994) pp. 198-200.

Nakayama, et al. AES, LEELS and XPS studies on the interface formation between layered semiconductors GaSe and InSe; Surface Science (1991).

Nishida, et al. Single-beam overwrite experiment using In-Se based phase-change optical media; American Insitute of Physics (1987) pp. 667-669.

Sanchez-Royo, et al. Optical and photovoltaic properties of indium selenide thin films prepared by van der Waals epitaxy; Journal of Applied Physics (2001) pp. 2818-2823.

Otsmane, et al. Epitaxy of layered semiconductor thin films; Applied Surface Science (1993) pp. 479-481.

Emery, et al. Reflection high-energy electron diffraction studies of InSe and GaSe layered compounds grown by molecular beam epitaxy; Journal of Applied Physics (1992) pp. 3256-3259.

Tatsuyama, et al. Heteroepitaxy between layered semiconductors GaSe and InSe; Applied Surface Science (1989) pp. 539-543.

Gashimzade, et al. Eneregy spectrum and effective mass of carriers in the InSe/GaSe superlattice; Z. Physics (1996) pp. 219-222.

Shigetomi, et al. Electrical and photovoltaic properties of Cu-doped p-GaSe/n-InSe heterojunction; Journal of Applied Physics; (2000); pp. 1520-1524.

\* cited by examiner

SECTION A-A

300 ↓

310
SELECT A SUBSTRATE

312
FABRICATE A FIELD LAYER ON THE SUBSTRATE

314
FABRICATE A SECOND DIODE LAYER OF DIODE MATERIAL ON THE FIELD LAYER

316
FABRICATE A FIRST DIODE LAYER OF CIS PHASE-CHANGE MATERIAL ON THE SECOND DIODE LAYER

318
FABRICATE GRID CONTACTS ON THE FIRST DIODE LAYER

FIG. 5

ULTRA-HIGH DENSITY STORAGE DEVICE USING PHASE CHANGE DIODE MEMORY CELLS AND METHODS OF FABRICATION THEREOF

FIELD OF THE INVENTION

The present invention relates to ultra-high density data storage devices. More particularly, the present invention involves ultra-high density data storage devices having diode memory cells using materials containing copper, indium, and selenium, and methods of fabricating the diode memory cells.

BACKGROUND OF THE INVENTION

Electronic devices, such as palm computers, digital cameras and cellular telephones, are becoming more compact and miniature, even as they incorporate more sophisticated data processing and storage circuitry. Moreover, types of digital communication other than text are becoming much more common, such as video, audio and graphics, requiring massive amounts of data to convey the complex information inherent therein. These developments have created an enormous demand for new storage technologies that are capable of handling more complex data at a lower cost and in a much more compact package. Efforts are now underway to enable the storage of data on a scale of ten nanometers (100 angstroms) up to hundreds of nanometers, referred to herein as "ultra-high density data storage."

One method of storing data at ultra-high densities involves utilizing a directed energy beam. As used herein a "directed energy beam" means a beam of particles, such as electrons, or a beam of photons or other electromagnetic energy, to heat the [GG1]medium so that it changes states[GG2] [GG3]. As used herein, "state" is defined broadly to include any type of physical change of a material, whether from one form to another, such as crystalline to amorphous, or from one structure or phase to another, such as different crystalline structures. As used herein, the term "phase change" means a change between different states in a material.

A state change may be accomplished by changing a material from crystalline to amorphous, or the reverse, by the application of an electron or light beam. To change from the amorphous to crystalline state, beam power density is increased so as to locally heat the medium to a crystallization temperature [GG4]. The beam is left on long enough to allow the medium to anneal into its crystalline state. To change from crystalline to amorphous state, the beam power density is increased to a level high enough to locally melt the medium and then rapidly decreased so as to allow the medium to cool before it can reanneal. To read from the storage medium, a lower-energy beam is directed to the storage area to cause activity, such as current flow representative of the state of the storage area.

An example of an ultra-high density storage device is given in U.S. Pat. No. 5,557,596 granted to Gibson et al. on Sep. 17, 1996 ("Gibson"). In Gibson, a plurality of electron emitters direct beams of electrons to a phase-change layer in data storage media. The electron beams are used to write data by causing a change of state in the phase-change layer, and read data by emitting lower energy beams to generate activity at the local storage areas indicative of the state of each storage area.

To effectively sense contrasts in states or phases of phase-change materials, a diode may formed having a junction for sensing carrier flow in response to an electron or light beam focused on a data storage memory cell in the phase-change layer. Such diode junctions are utilized for carrier detection in photovoltaic devices, in which light beams impact the diode, and in cathodovoltaic devices, in which electron beams are directed to the diode. Photovoltaic devices include phototransistor devices and photodiode devices. Cathodovoltaic devices include cathodotransistor devices and cathododiode devices. In addition, diode junctions may be utilized for carrier flow detection in photoluminescent and cathodoluminescent devices. Reference is made to copending patent application Ser. No. 10/286,010, filed on Oct. 31, 2002 for a further description of the structure and function of diode junctions in these devices.

Diode junction layers need to be composed of materials having electrical properties suitable for generating a desired carrier flow across the diode junction. As used herein, the term "carrier flow" refers to either electron current or the flow of holes, depending on whether the materials are n-type or p-type. As used herein, the term "materials" includes all kinds and types of compounds, alloys and other combinations of elements. Various types of junctions may be formed in the context of the above data storage devices, such as heterojunctions, homojunctions, and Schottky junctions, in order to achieve the desired detection results.

Junction problems can sometimes be avoided by forming a homojunction using the same material for both layers of the diode. However, in such case, it is usually necessary to dope one or both layers, in order to form a suitable diode having one layer with p-type characteristics and the other layer with n-type characteristics. Some materials do not readily accept doping. Furthermore, doping usually increases the fabrication steps needed and the complexity of fabrication to form the diode layers. It may also be desirable to dope the semiconductor materials used in heterojunction and Schottky diodes if the carrier density and/or resistivity of the material need to be adjusted.

In some cases, one of the diode layers may also function as the phase-change layer of the data storage device. One material being used for a phase-change layer in such data storage devices is an indium chalcogenide compound, such as indium selenide (InSe). The material has suitable phase change characteristics in transitioning between first and second phases, where both phases exhibit different electrical properties. However, there are difficulties with InSe forming a suitable diode layer. Although single crystal InSe material may be doped, polycrystalline InSe is naturally an n-type material and cannot be readily p-doped. Thus, using polycrystalline InSe as a phase-change layer limits the choices of a suitable second layer with which it can form a data detecting diode junction. In that case, the second layer usually must have p-type electrical properties to form a suitable carrier flow across a diode junction.

SUMMARY OF THE INVENTION

One embodiment comprises an ultra-high density data storage device using phase-change diode memory cells, and having a plurality of emitters for directing beams of directed energy, a layer for forming multiple data storage cells and a layered diode structure for detecting a memory or data state of the storage cells, wherein the device comprises a phase-change data storage layer capable of changing states in response to the beams from the emitters, comprising a material containing copper, indium, and selenium.

Another embodiment comprises a method of forming a diode structure for a phase-change data storage array, having multiple thin film layers adapted to form a plurality of data storage cell diodes, wherein the method comprises depositing a first diode layer of material on a substrate, and depositing a second diode layer of phase-change material on the first diode layer, the phase-change material containing copper, indium, and selenium.

Other aspects and advantages of the present invention will become apparent from the following detailed description, which, when taken in conjunction with the accompanying drawings, illustrates by way of example the principles of the invention.

BRIEF DESCRIPTION OF THE DRAWINGS

FIG. 5 is a flow chart describing a method for fabricating the diode structure shown in FIG. 4;

Figure 1:
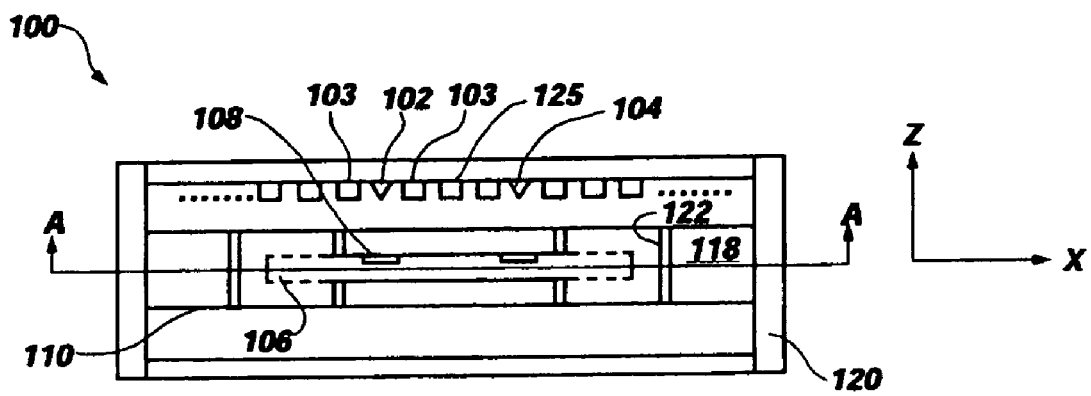
FIG. 1 is a partial side view of an exemplary data storage system.

The same numerals in the Figures are assigned to similar elements in all the figures. Embodiments of the invention are discussed below with reference to the Figures. However, those skilled in the art will readily appreciate that the detailed description given herein with respect to these figures is for explanatory purposes as the invention extends beyond these limited embodiments.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

FIG. 1 shows an exemplary ultra-high density data storage system 100 having electron emitters 102 and 104 and a phase-change data storage medium 106. Electron emitter 102 and 104 are mounted above the storage medium 106, that has a number of storage areas, such as 108, that are impacted by electron beams from the emitters. Micromovers, based on micro-electromechanical systems (MEMS) technology, cause relative movement between the phase-change medium 106 and the electron emitters 102. Micromover 110 is connected to the storage medium 106 and moves it relative to the emitters 102, 104, so that each emitter can impact a number of different data storage areas.

Figure 2:
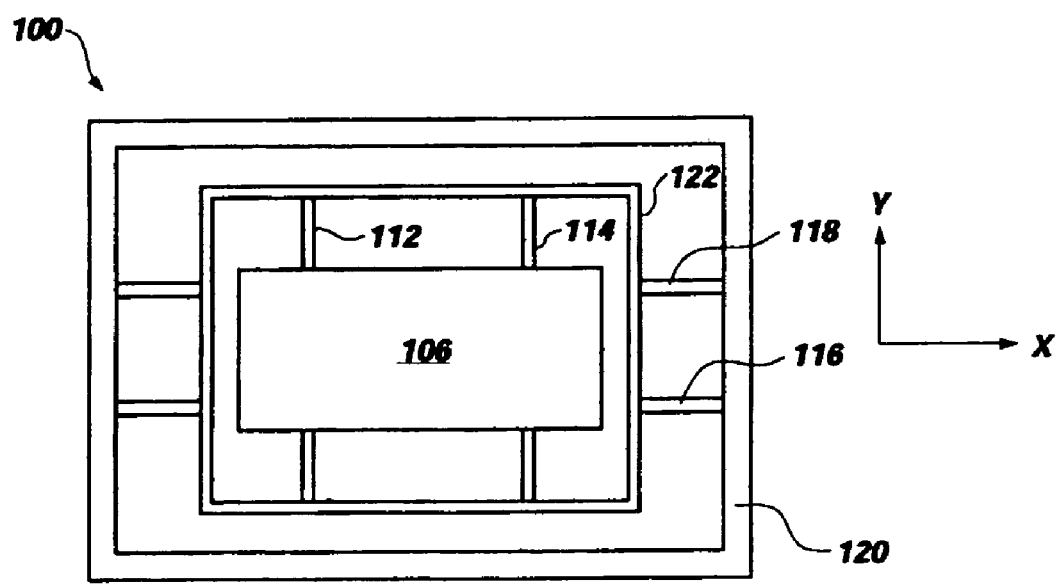
FIG. 2 is a plan view of the storage system shown in FIG. 1.

FIG. 2 is a top view of the cross section A—A in FIG. 1, showing the micro-mover 110 fabricated to scan the medium 106 in the X and Y directions. The storage medium 106 is supported two sets of thin-walled micro-fabricated flexible beams or springs 112 and 114 which flex to allow the medium 106 to move in the X direction with respect to a supporting frame 122. A second set of springs 116 and 118 are connected between the supporting frame 122 and the outer casing 120 and flex to allow the medium 106 and frame 122 to move in the Y direction with respect to the casing 120. The field emitters scan over the medium, or the medium scans over the field emitters in the X-Y directions by electrostatic, electromagnetic or piezoelectric means known in the art.

Figure 3:
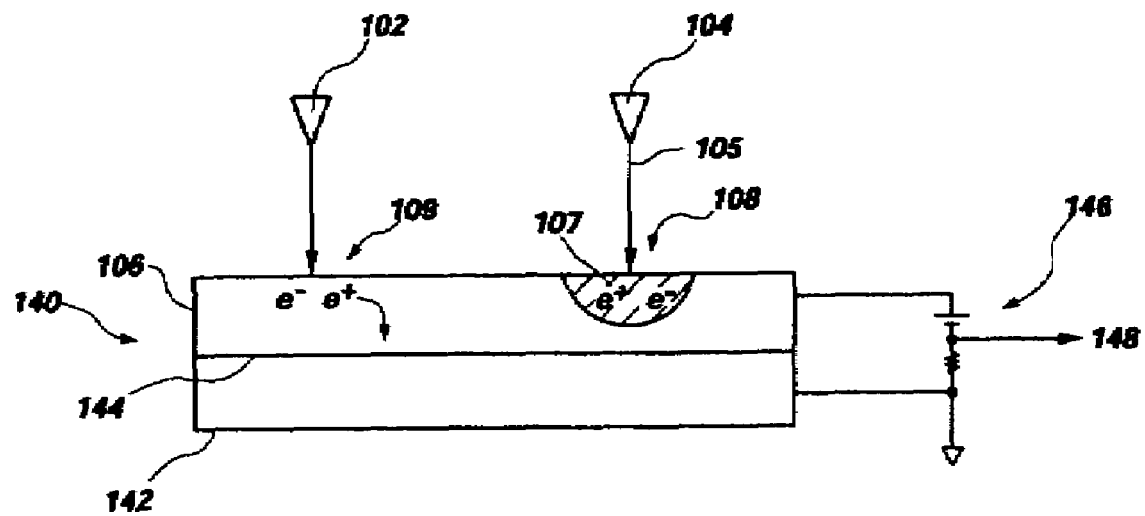
FIG. 3 is a schematic view of a portion of the storage system shown in FIG. 1.

FIG. 3 shows an exemplary diode structure 140 comprising the phase-change layer 106 described above and a second diode layer 142 forming a diode junction 144 at the interface of the two layers. Typically, phase-change layer 106 and second diode layer 142 have different electrical characteristics, to encourage the movement of carriers across the junction. For example, phase change layer 106 may be n-type and second diode layer 142 may be p-type. Doping may be used to change or enhance the electrical characteristics of each layer. An external circuit 146 is connected to the diode to impress a voltage across the junction so as to create a bias, either in a reverse direction or in a forward direction, depending on the needs of the circuit. An output 148 is generated by circuit 146 and is representative of the magnitude of carrier flow across junction 144.

Reading or detecting is carried out by directing a narrow beam of electrons 105 onto the surface of phase change layer 106 at data storage area 108. The incident electrons excite electron-hole pairs 107 near the surface of the storage area 108. The diode 140 is reversed-biased by external circuit 146 so that the minority carriers that are generated by the incident electrons drift toward the diode junction 144. Minority carriers that do not recombine with majority carriers before reaching the junction are swept across the junction, causing a current to flow in the external biasing circuit 146. Writing onto diode 140 is accomplished by increasing the power density of the electron beam 105 enough to locally alter some property of the diode at storage area 108, such as collection efficiency of minority carriers.

Figure 4:
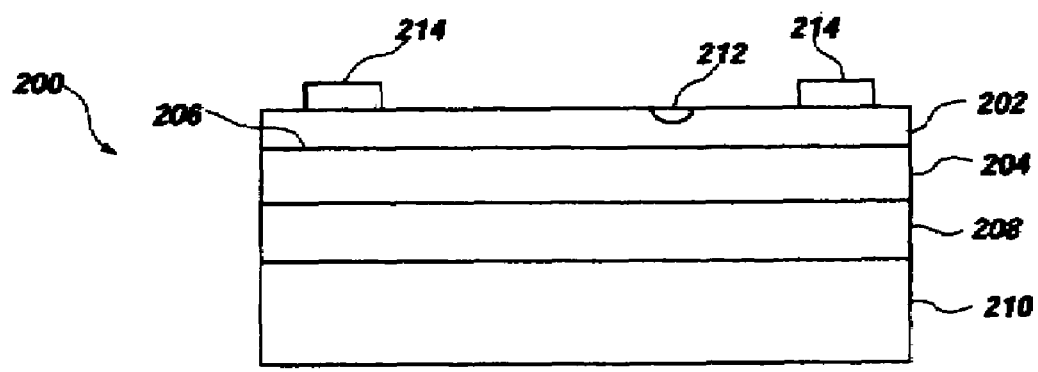
FIG. 4 is a schematic side view of the diode structure according to one embodiment of the present invention.

In FIG. 4, a schematic side view of a diode configuration 200 in accordance with one embodiment of the present invention is shown. A phase-change layer 202 is composed of a CuInSe, also known as CIS, compound or material which can be reversibly changed from an amorphous to a crystalline state by heating and cooling it at suitable rates. This state change is useful for data storage, since the amorphous state is less conductive that the crystalline state. When the phase-change layer 202 is changed from the crystalline state to the amorphous state at the storage area 212, its electrical properties significantly change. Accordingly, the number of carriers swept across the diode junction will be significantly different in the amorphous state than when the CIGS layer is in a crystalline state.

The terms "CIS," "CIS compound" or "CIS material" refer to a material having any ratio of copper, indium, and selenium, such as $CuInSe_2$, including but not limited to CIS doped with gallium (CIGS). The term "CIGS" refers to CuInSe doped with gallium to form various stoichiometric materials of copper indium gallium selenide including but not limited to $(Cu(In,Ga)Se_2)$ and $Cu(In_{1-x}Ga_x)Se_2$. Thus, the first diode layer may be a CIS compound and may also be a CIGS compound.

Returning to FIG. 4, the second diode layer 204 is disposed below the phase-change layer 202 to form a diode junction 206. In accordance with one embodiment, the second diode layer 204 may be a CIS material, including a CIGS compound. In this instance, the CIS or CIGS phase-change layer 202 and the CIS or CIGS second layer 204 form a highly compatible diode junction with excellent matching characteristics. One or both of the CIS phase-change layer 202 and the CIS diode layer 204 may be doped with gallium, so that the first layer 202 and the second layer 204 form a homojunction or a highly-compatible heterojunction. The doping levels for the CIGS phase-change layer and/or the second layer of CIGS may be varied so that there is an acceptable flow of carriers across the diode junction.

In another embodiment, as shown in FIG. 4, a data storage array of multiple thin film layers adapted to form a plurality of data storage cell diodes can be formed. The data storage array can comprise a silicon substrate 210. The data storage array can further include a first diode layer 204 comprising a material fabricated over the silicon substrate. The data storage array can also include a second diode layer 202 of phase-change material that can be fabricated on the first diode layer to form a diode junction 206 with the second diode layer. The phase-change material can contain copper, indium, selenium and gallium.

The use of CIS or CIGS as the phase-change layer 202 and CIS or CIGS as the second layer 204 is desirable for a number of reasons. The diode junction is either a homojunction or a heterojunction with diode layers of very similar characteristics, resulting in essentially no junction mismatches or boundary problems. Both CIS and CIGS materials may be readily doped and the amount of doping may be varied, so that most desired diode junctions may be fabricated. Furthermore, the phase-change layer and the second diode layer can be formed in the same vacuum system, making it is easier to form a clean high quality interface between the two layers. This diode structure also reduces processing costs, since the time required for an additional fabrication stage is eliminated. In addition, CIS and CIGS materials tend to have relatively low thermoconductivity, so heat applied to the phase-change layer may not affect the underlying CIS or CIGS layer. The thickness of the phase-change layer and laser wavelength and power may also be varied to prevent the underlying layer from being affected by the heat applied to the phase-change layer.

The diode configuration 200 shown in FIG. 4 may be used as a detection device in various data storage detection devices, such as photovoltaic devices, cathodovoltaic devices, photoluminescent devices and cathodoluminescent devices, all described above.

FIG. 5 discloses a method of fabrication 300 of the diode structure shown in FIG. 4. Fabrication of the diode structure 200 starts at step 310 with the selection of a substrate layer 210 from silicon or various silicon oxide materials. In the present embodiment, substrate 210 is preferably of a material that can be doped with sodium, which promotes the growth of the subsequent layers. Such material includes, but is not limited to, silicon, silicon oxide, soda lime glass, and other semiconductor materials.

At step 312, an electrical potential field layer, or back contact, 208 is fabricated on the surface of substrate 210. Field layer 208 is fabricated from molybdenum (Mo) using a sputtering technique, known to those skilled in the art, to a thickness of 0.5–2.0 microns, with 1 micron being used in this embodiment. Other suitable conductive materials are indium, titanium nitride, platinum, gold, zinc oxide, indium tin oxide and/or nickel.

Next, at step 314, second diode layer 204 is fabricated on field layer 208. In one embodiment, diode layer 204 is fabricated with a CIS compound and may be doped with a p-type dopant. Other suitable diode materials, besides CIS materials, may be used. Second diode layer 204 may have a thickness range of about one to six microns with 3.5 microns being used in this embodiment, and is applied by elemental evaporation in a vacuum. Other methods of fabrication can include sputtering or electrodeposition using an electrolyte of $K_2SO_4$, $CuSO_4$, $In_2S(SO_4)_3$, and/or $SeO_2$. In the event that second diode layer 204 is a CIS material, it may also be doped with gallium to form $CuInGaSe_2$ or other CIGS compounds.

At step 316, after application of the second diode layer 204, the first diode layer 202 is fabricated on layer 208. In one embodiment, first diode layer 202 is fabricated with $CuInSe_2$ or other CIS compounds, which may or may not be doped with gallium. First layer 202 may have a thickness range of 50–200 nm. First layer 202 may be applied by elemental evaporation in vacuum, which may be the same vacuum used to apply the second layer 204. In an alternative embodiment, fabrication of first layer 202 can be performed with electrodeposition using an electrolyte.

In an embodiment in which layers 202 and 204 are CIGS films, layers 202 and 204 may be grown using a three-stage co-evaporation process. First, an $(InGa)_2Se_3$ layer is deposited at 400° C., followed by evaporation of Cu and Se at 550° C. to make the film slightly Cu-rich. The composition is restored to slightly Cu-poor by the addition of $(InGa)_2Se_3$ again.

At step 318, electric grid contacts 214 are fabricated on the surface of layer 202 because the first layer of InSe 202 has a low electrical conductivity. Contacts 214 are made of a conductive material the same as or similar to field layer 208. For example, grid contacts 214 may be made of Mo at a thickness ranging from 0.5 to 5 microns, with 1 micron used in this embodiment. Alternately, the grids may be made of other suitable materials, such as Au or In. The material may be sputter-deposited or made by any other suitable fabrication techniques known to those skilled in the art. Grid contacts 214 and field layer 208 may be the connection points for applying a voltage source circuit to the diode 200 during a read operation.

Testing has been performed on sample CIGS phase-change layers as embodied in the present invention. In one such test, the CIGS layer showed a percentage composition of Cu 17.62%, Ga 5.25%, Se 53.23%, and In 23.90%. The surface of the CIGS layer was first laser smoothed. Then writing and cycling experimentation was performed on the surface using laser beams. During laser writing, the power was set at 5 to 10 mW, with a pulse width of 600 ns and a wavelength of 532 nm. The spot size was 0.6 to 1.2 microns in diameter.

Figure 6:
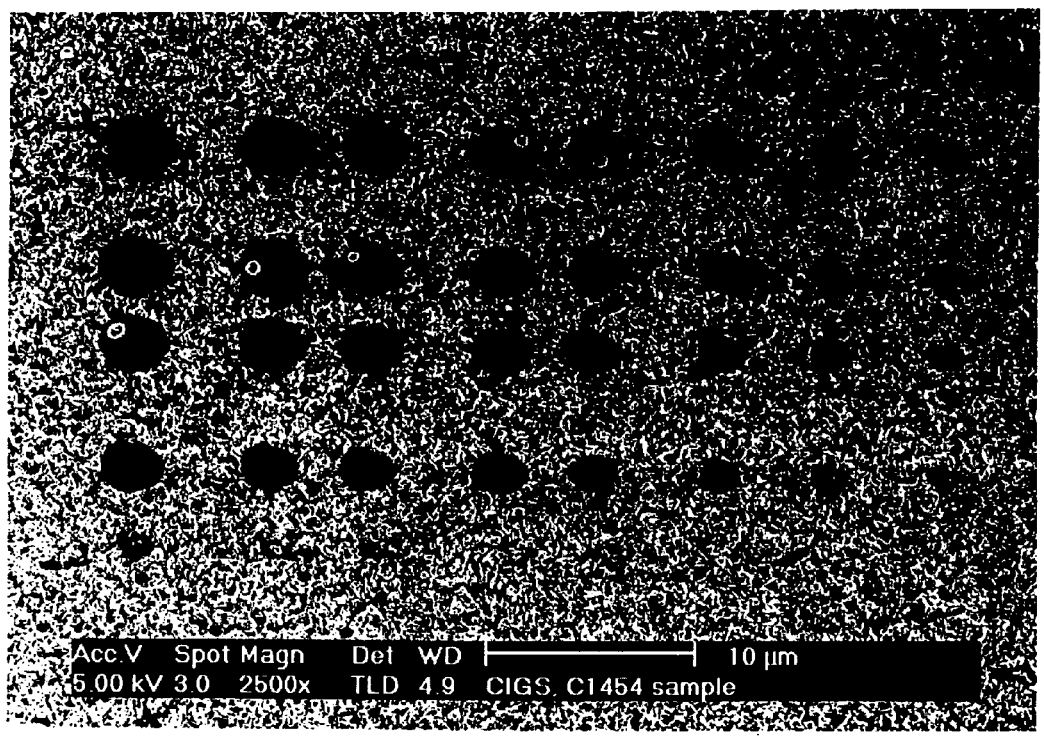
FIG. 6 is a scanning electron microscope image showing testing of CIGS as a phase-change material according to an embodiment of the present invention.
Figure 7:
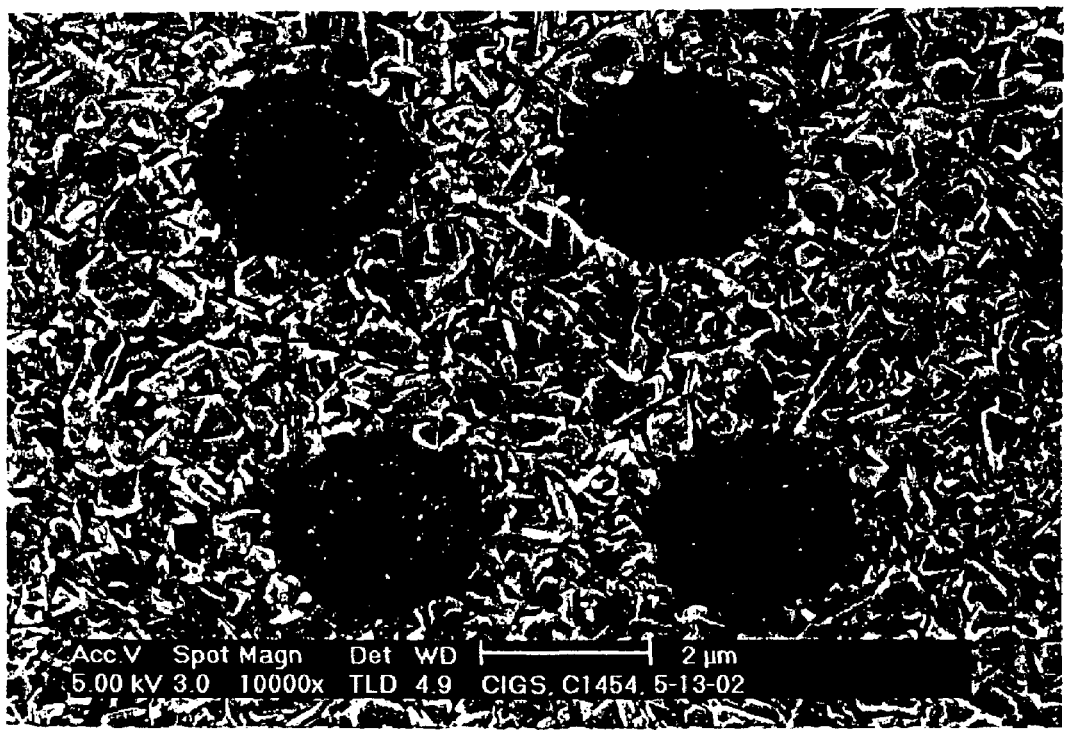
FIG. 7 is another scanning electron microscope image according to the embodiment of the present invention shown in FIG. 6.

FIGS. 6 and 7 are scanning electron microscope (SEM) images showing the results of exposing laser beams to the above-mentioned crystalline CIGS material. FIG. 6 shows a 2,500 times magnification of a layer of polycrystalline CIGS material after having been impacted with a laser operating at various voltages between 5.0 to 10.0 mW. A matrix of spots are shown, indicating that a physical change has taken place, either to another crystalline phase or to an amorphous state. FIG. 7 shows a 10,000 times magnification of four spots in the same crystalline CIGS material. The spots have clearly undergone a physical change that could be detected to show the presence of data. These scans show that substantial state changes occur in such CIGS materials, indicating the likelihood of good phase-change abilities.

Testing has also been conducted on CIS and CIGS materials used as a second diode layer. See my copending patent application entitled "Ultra-High Density Storage Device Using Phase Change Diode Memory Cells, and Methods of Fabrication Thereof" [HP 10020-1669]. The tests have included measuring the I-V characteristics of the diodes, performing quantum efficiency (optical), and performing electron beam induced current (EBIC) measurements, which simulate a "read" mode for data storage. Again, the results were promising for the desired diode application.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. An ultra-high density data storage device using phase-change diode memory cells, for use with a plurality or emitters for directing beams of directed energy, a layer for forming multiple data storage cells and a layered diode structure for detecting a memory or data state of the storage cells, the device comprising:
    a phase-change data storage layer capable of changing states in response to the beams, comprising a material containing copper, indium and selenium.

2. The storage device according to claim 1, wherein the phase-change data storage layer is doped with gallium.

3. The storage device according to claim 2, wherein the data storage layer comprises a $Cu(InGa)Se_2$ material.

4. The storage device according to claim 2, wherein the data storage layer comprises a $Cu(In_{1-x}Ga_x)Se_2$ material.

5. The storage device according to claim 1, wherein the data storage layer comprises a layer of the layered diode structure.

6. The storage device according to claim 1, further comprising a second layer adjacent to the data storage layer to form the diode structure.

7. The storage device according to claim 1, wherein the second layer comprises a CuInSe material.

8. The storage device according to claim 7, wherein the second layer is doped with gallium.

9. The storage device according to claim 1, further comprising a silicon substrate adjacent to the second layer.

10. The storage device according to claim 1, wherein the diode structure is a detection element in one of a group of data storage detection devices, selected from the group consisting of photovoltaic devices, cathodovoltaic devices, photoluminescent devices and cathodoluminescent devices.

11. A data storage array of multiple thin film layers adapted to form a plurality of data storage cell diodes comprising:
    a silicon substrate;
    a first diode layer comprising a material fabricated over the silicon substrate; and
    a second diode layer of phase-change material, fabricated on the first diode layer to form a diode junction with the second diode layer, the phase-change material containing copper, indium, selenium and gallium.

12. The data storage array according to claim 11, wherein the second diode layer of phase-change material comprises a $Cu(InGa)Se_2$ material.

13. The data storage array according to claim 11, wherein the second diode layer of phase-change material comprises a $Cu(In_{1-x}Ga_x)Se_2$ material.

14. The data storage array of claim 11, wherein the second diode layer is phase changeable between first and second states, in response to a directed energy beam.

15. The data storage array of claim 14, wherein the first and second states are amorphous and crystalline states.

16. The data storage array of claim 14, wherein the first and second states are different crystalline states.

17. The data storage array according to claim 11 wherein the first diode layer comprises a CuInSe material.

18. The data storage array according to claim 11, further comprising a field layer fabricated on the substrate.

19. The data storage array according to claim 18, wherein the field layer is composed of molybdenum.

20. The data storage array according to claim 11, further comprising a voltage source connected to the array on opposite sides of the diode junction to impress a voltage across the junction so that a current flows through the junction in response to a directed energy beam and is representative of a data state of a data storage cell diode.

* * * * *

UNITED STATES PATENT AND TRADEMARK OFFICE
CERTIFICATE OF CORRECTION

PATENT NO. : 7,057,202 B2  Page 1 of 1
APPLICATION NO. : 10/673003
DATED : June 6, 2006
INVENTOR(S) : Gary R. Ashton et al.

It is certified that error appears in the above-identified patent and that said Letters Patent is hereby corrected as shown below:

In column 7, line 18, in Claim 1, delete "or" and insert -- of --, therefor.

Signed and Sealed this

Twenty-third Day of June, 2009

JOHN DOLL
*Acting Director of the United States Patent and Trademark Office*